(12) United States Patent
Yuan (10) Patent No.: US 8,253,601 B2
(45) Date of Patent: Aug. 28, 2012

(54) MINIATURE ELECTRONIC DEVICE

(75) Inventor: Hui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 236 days.

(21) Appl. No.: 12/859,274

(22) Filed: Aug. 19, 2010

(65) Prior Publication Data

US 2011/0241910 A1 Oct. 6, 2011

(30) Foreign Application Priority Data

Mar. 31, 2010 (CN) .......................... 2010 1 0137043

(51) Int. Cl.
*G06F 1/16* (2006.01)
*H03K 17/94* (2006.01)
(52) U.S. Cl. .................................... 341/22; 361/679.27
(58) Field of Classification Search .................... 341/22; 361/679.27
See application file for complete search history.

(56) References Cited

U.S. PATENT DOCUMENTS

7,489,507 B2 * 2/2009 Karashima et al. ...... 361/679.28
* cited by examiner

*Primary Examiner* — Robert Pascal
*Assistant Examiner* — Khiem Nguyen
(74) *Attorney, Agent, or Firm* — Altis Law Group, Inc.

(57) ABSTRACT

A miniature electronic device includes a main body, a cover, two sliding boards and a functional component. The main body includes two rotation members and two connection members. Each rotation member includes a first annular groove, a second annular groove and a geared portion. Each connection member includes a first connection portion and a second connection portion having an equal length with the first connection portion. The cover includes two rotation shafts each including a first annular groove and a second annular groove. Each sliding board includes a rack. The functional component is below the two sliding boards. When the cover is opened or closed, the two rotation shafts are driven to rotate to drive the two geared portions to rotate in the two racks to cause the two sliding boards to slide relative to the main body, thereby exposing or covering the functional component.

8 Claims, 7 Drawing Sheets

MINIATURE ELECTRONIC DEVICE

BACKGROUND

1. Technical Field

The present disclosure relates to electronic devices and, particularly, to a miniature electronic device.

2. Description of Related Art

Electronic devices, especially miniaturized ones such as notebook computers, usually include a keyboard and an adjacent touch panel which uses a lot of space. Although this structure satisfies basic requirements, it is not suitable for further miniaturization of the electronic device.

BRIEF DESCRIPTION OF THE DRAWINGS

The components of the drawings are not necessarily drawn to scale, the emphasis instead being placed upon clearly illustrating the principles of a miniature electronic device. Moreover, in the drawings, like reference numerals designate corresponding parts throughout several views.

DETAILED DESCRIPTION

Figure 1:
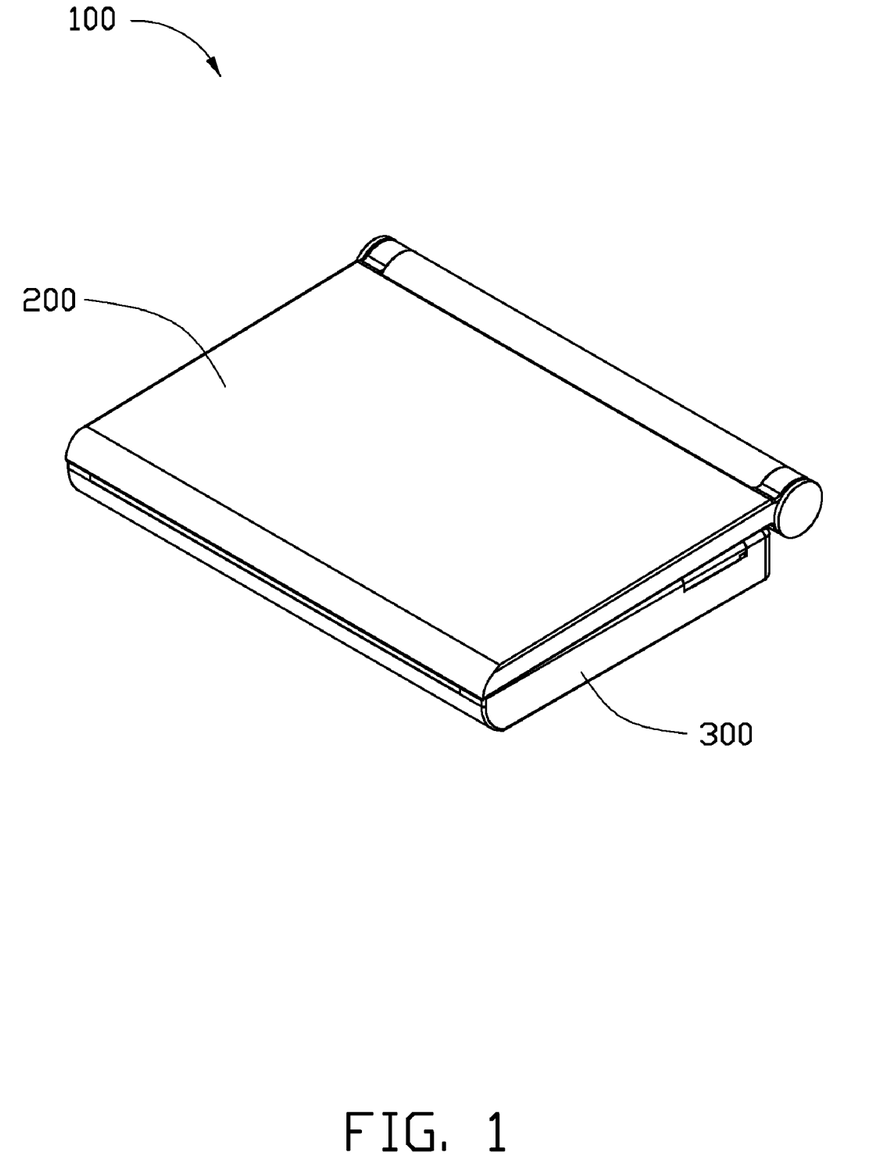
FIG. 1 is an isometric view of a miniature electronic device with a cover in accordance with an embodiment, showing the cover in a closed state.
Figure 2:
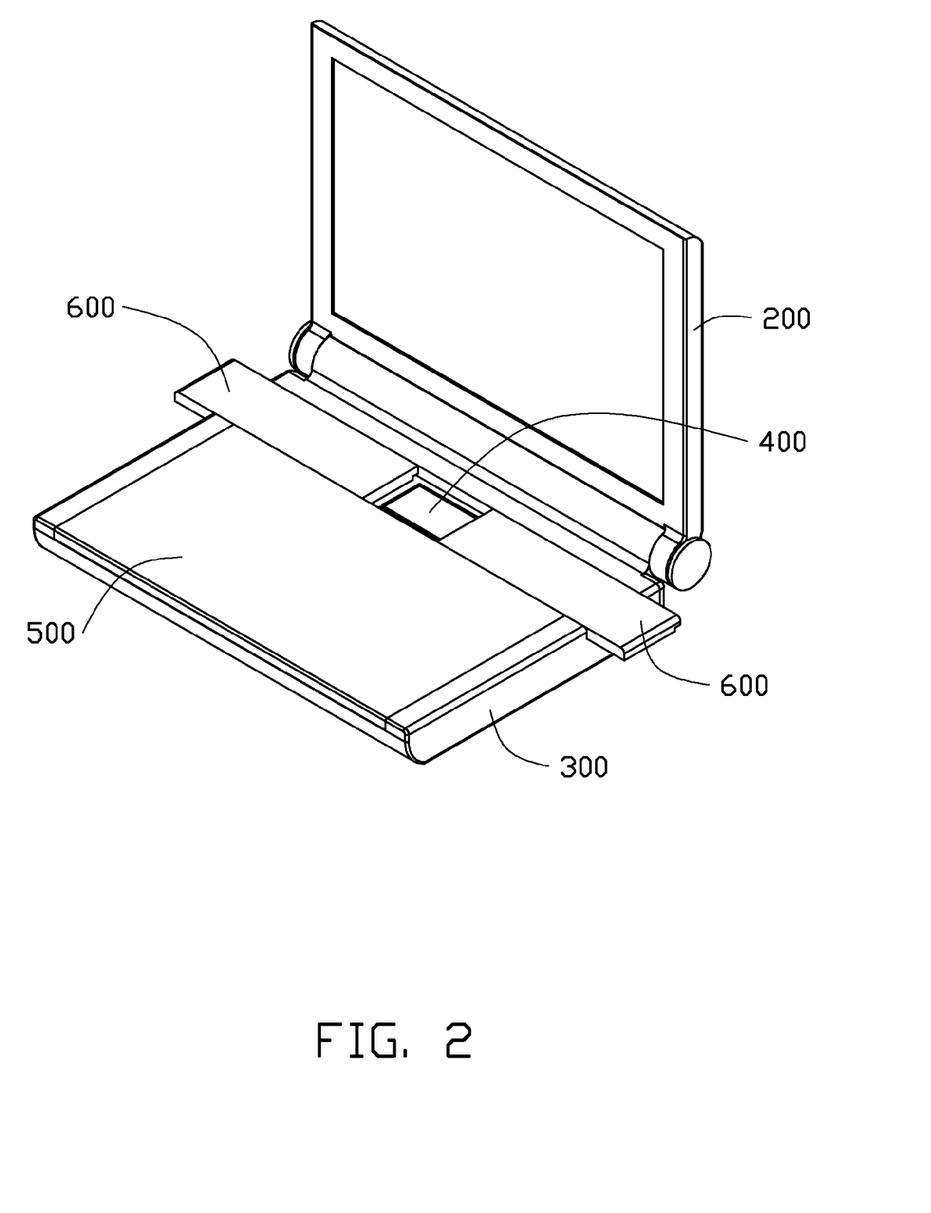
FIG. 2 is an isometric view of the miniature electronic device of FIG. 1, showing the cover in an open state.

Referring to FIGS. 1-2, an embodiment of a miniature electronic device 100 is illustrated. The miniature electronic device 100 includes a main body 300, a cover 200 rotatably connected to the main body 300, a main keyboard 500 (such as one commonly found on electronic devices) mounted on the main body 300 (keys not shown to simplify the drawing), two sliding boards 600 (the boards may in some embodiments be keyboards of the device 100) slidably connected to the main body 300, and a functional component 400 below the two sliding boards 600.

Figure 3:
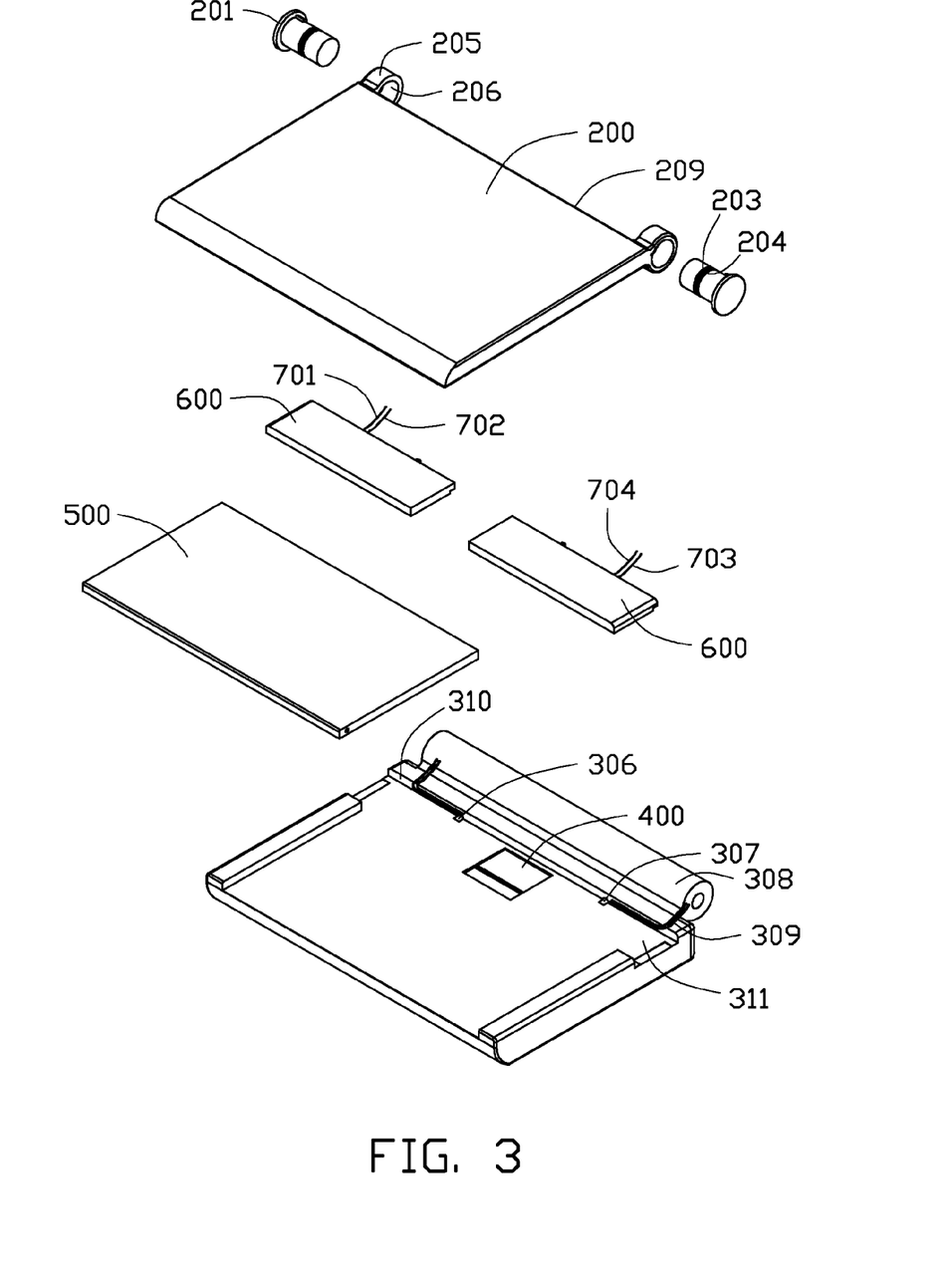
FIG. 3 is an exploded view of the miniature electronic device of FIG. 1.
Figure 4:
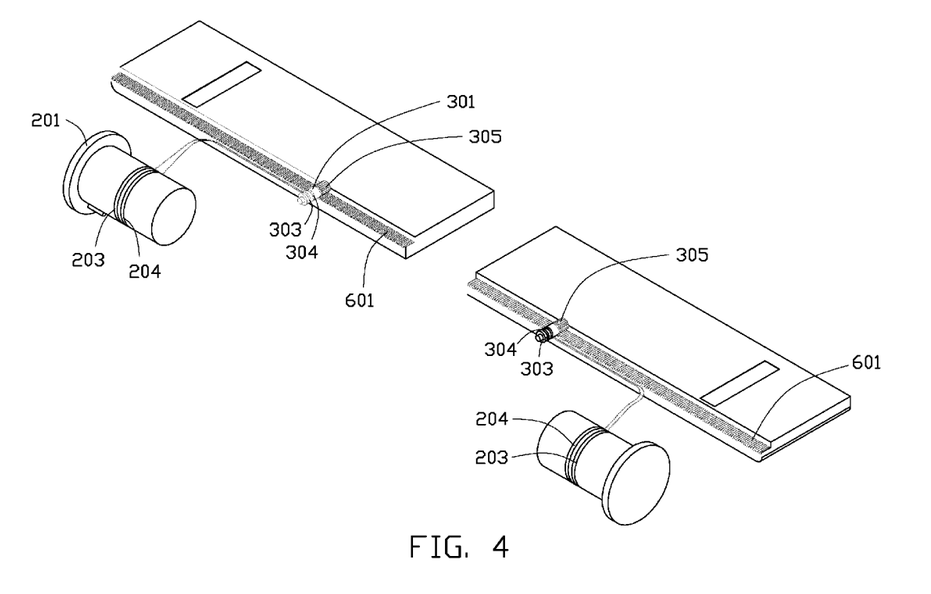
FIG. 4 is an enlarged view of two sliding boards and two rotation shafts of the miniature electronic device of FIG. 1.

Referring to FIGS. 3-4, the main body 300 includes a hollow shaft 308, and a first side plate 310 adjacent and parallel to the shaft 308. The main body 300 defines two blind holes 306 substantially perpendicularly extending across a side of the first side plate 310. The main body 300 further includes two rotation members 301. One end of each rotation member 301 is rotatably received in a corresponding blind hole 306.

Each rotation member 301 includes a first annular groove 303 and a second annular groove 304 around its lateral surface. A geared portion 305 is formed at an end of the rotation member 301. The first annular groove 303 and the second annular groove 304 are inside of the blind hole 306, and the geared portion 305 is exposed.

The cover 200 includes a second side plate 209 parallel to the first side plate 310, two extending portions 205 substantially perpendicularly extending from the second slide plate 209 at its ends, and two rotation shafts 201. Each extending portion 205 defines a through hole 206 parallel to the second side plate 209 in lengthwise orientation. The two extending portions 205 are placed at two opposite ends of the shaft 308, and the two rotation shafts 201 are respectively extended through the through holes 206 to be inserted into the shaft 308, thereby rotatably connecting the cover 200 to the main body 300.

Each rotation shaft 201 defines a first annular groove 203 and a second annular groove 204 in its lateral surface.

Figure 5:
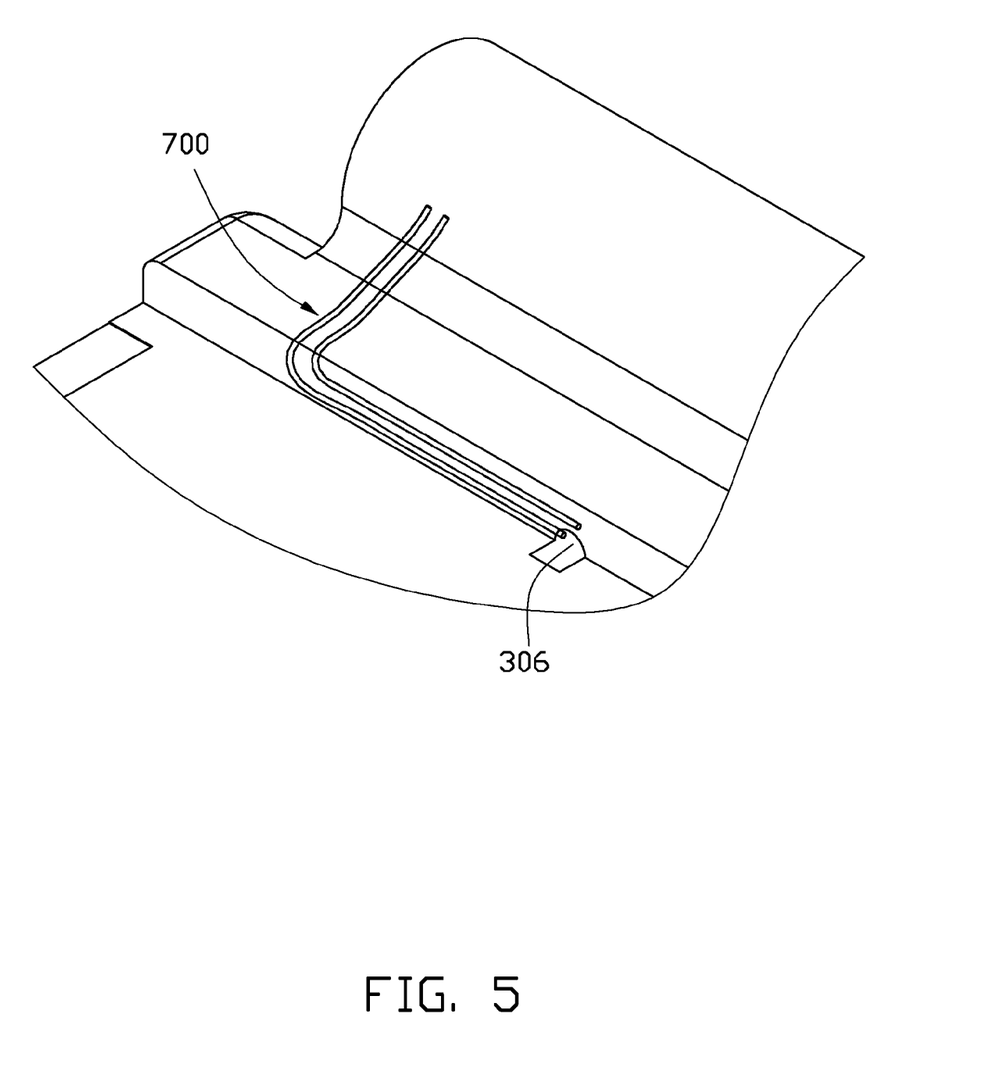
FIG. 5 is cut-away view of the miniature electronic device of FIG. 1, showing a connection member and a blind hole.
Figure 6:
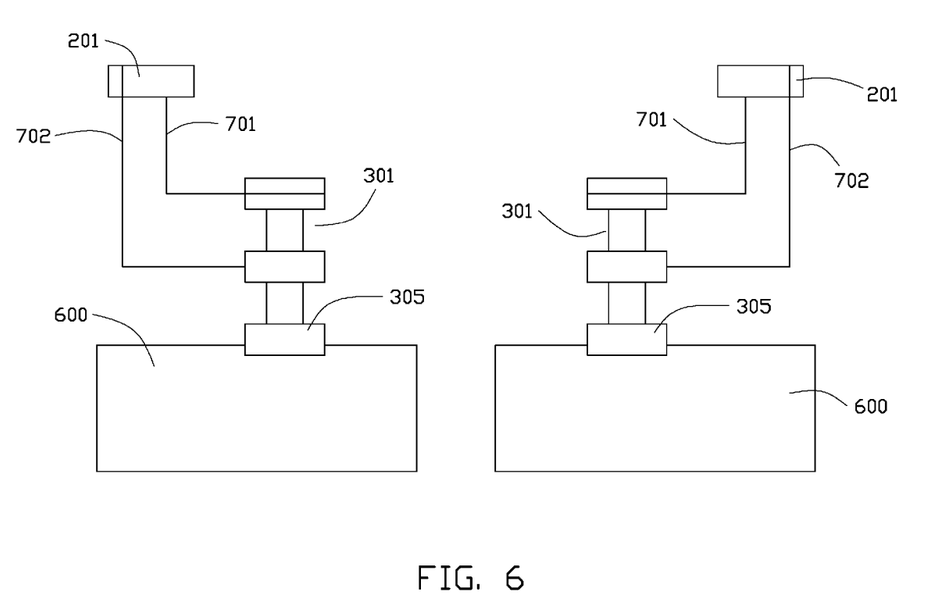
FIG. 6 shows that two connection members are tightenedly coiled around two rotation shafts and two rotation members in a first manner.

Referring also to FIGS. 5-6, the main body 300 further includes two connection members 700. Each connection member 700 includes a first connection portion 701 and a second connection 702 parallel to the first connection portion 701 and having an equal length with the first connection portion 701. In the embodiment, one end of the first connection portion 701 is clockwise tightenedly coiled around the first annular groove 303 of a corresponding of one of the two rotation members 301, and another end is tightened to counter-clockwise coil around the second annular groove 204 of a corresponding of one of the two rotation shafts 201, thereby causing the first connection portion 701 to be tightened between the first annular groove and the second annular groove 204. One end of the second connection portion 702 is counter-clockwise tightenedly coiled around the second annular groove 304 of the corresponding of one of the two rotation members 301, and another end is tightened to clockwise coil around the first annular groove 203 of the corresponding of one of the two rotation shafts 201, thereby causing the second connection portion 702 to be tightened between the second annular groove 304 and the first annular groove 203.

Figure 7:
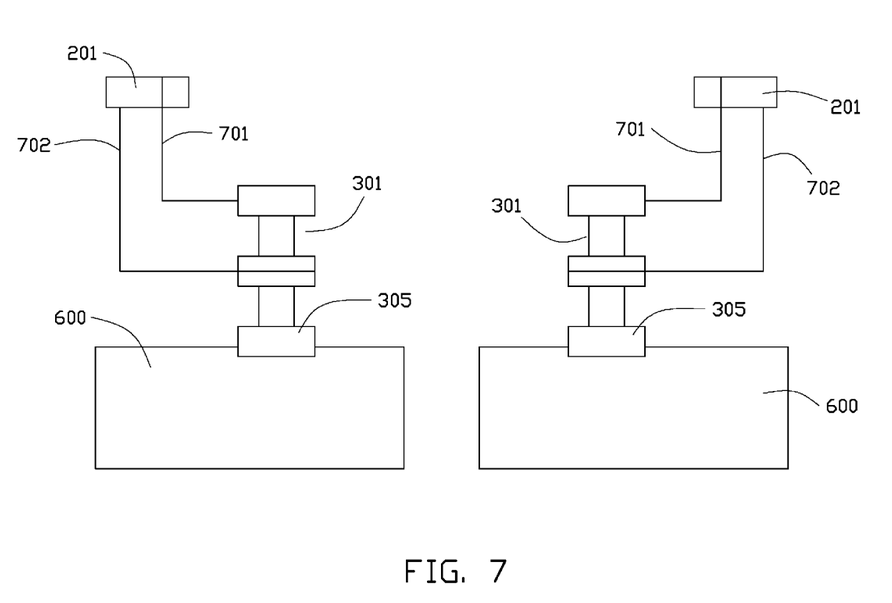
FIG. 7 shows that the two connection members are tightenedly coiled around the two rotation shafts and the two rotation members in a second manner.

As shown in FIG. 7, in another embodiment, one end of the first connection portion 701 is counter-clockwise tightenedly coiled around the first annular groove 303 of a corresponding of one of the two rotation members 301, and another end is tightened to clockwise coil around the second annular groove 204 of a corresponding of one of the two rotation shafts 201. One end of the second connection portion 702 is clockwise tightenedly coiled around the second annular groove 304 of the corresponding of one of the two rotation members 301, and another end is tightened to counter-clockwise coil around the first annular groove 203 of the corresponding of one of the two rotation shafts 201. In the embodiment, the connection member is a lightweight cord made of metal or other materials having sufficient strength to resist pulling.

Referring to FIG. 4 again, each sliding board 600 includes a rack 601 parallel to the first side plate 310. The main body 300 further includes a sliding surface 311 parallel and adjacent to the first side plate 310. The sliding surface 311 is configured for providing a slideway for the two sliding boards 600. The geared portion 305 is used to engage the rack 601 to drive the sliding board 600 to slide relative to the main body 300 along the slideway, thereby exposing or covering the functional component 400.

During opening the cover 200, the two rotation shafts 201 are clockwise rotated together with the cover 20, because the two second connection portions 702 are tightened between the second annular groove 304 and the first annular groove 203, the two second connection portions 702 are driven to coil around the two rotation shafts 201, causing the two rotation members 301 to be rotated in the two blind holes 306. The two geared portions 305 are then driven to rotate and engage the two racks 601, thereby driving the two sliding boards 600 to slide away from each other to expose the functional component 400. During rotation of the two rotation members 301, the two first connection portions 701 are driven to coil around the two rotation members 301, thereby causing the two first connection portions 701 always to be tightened between the first annular groove and the second annular groove 204.

During closing the cover 200, the two rotation shafts 201 are counter-clockwise rotated together with the cover 200, because the two first connection portions 701 are tightened between the first annular groove and the second annular groove 204, the two first connection portions 701 are driven to coil around the rotation shaft 201 and cause the two rotation members 301 to be rotated in the two blind holes 306. The two geared portions 305 are then driven to rotate and engage the two racks 601, thereby driving the two sliding boards 600 to slide toward each other to cover the functional component 400. During the rotation of the two rotation members 301, the two second portions 702 are driven to coil around the two rotation members 301, thereby causing the two second connection portions 702 always to be tightened between the second annular groove 304 and the first annular groove 203.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A miniature electronic device comprising:
   a main body comprising:
      two rotation members each defining a first annular groove and a second annular groove around a lateral surface thereof, and a geared portion formed at an end thereof; and
      two connection members each comprising a first connection portion and a second connection portion parallel to the first connection portion and having an equal length with the first connection portion, wherein one end of the first connection portion is clockwise tightenedly coiled around the first annular groove of a corresponding one of the two rotation members and one end of the second connection portion is counter-clockwise tightenedly coiled around the second annular groove of the corresponding one of the two rotation members;
   a cover rotatably connected to the main body and comprising two rotation shafts each comprising a first annular groove and a second annular groove around a lateral surface thereof, wherein another end of the first connection portion is be tightened to counter-clockwise coil around the second annular groove of a corresponding one of the rotation shafts, causing the first connection portion to be tightened between the first annular groove of the corresponding rotation member and the second annular groove of the corresponding rotation shaft, and another end of the second connection portion is tightened to clockwise coil around the first annular groove of the corresponding one of the two rotation shafts, causing the second connection portion to be tightened between the second annular groove of the corresponding rotation member and the first annular groove of the corresponding rotation shaft;
   two sliding boards slidably connected to the main body and each of the two sliding boards comprising a rack; and
   a functional component mounted on the main body and below the two sliding boards;
   wherein when the cover is opened or closed, the two rotation shafts are rotated together with the cover and drive the first connection portions and the second connection portions to move, causing the two rotation members to rotate relative to the main body, the two geared portions are then driven to rotate and engage the two racks to cause the two sliding boards to slide relative to the main body, thereby exposing or covering the functional component.

2. The miniature electronic device as described in claim 1, further comprising a main keyboard mounted on the main body.

3. The miniature electronic device as described in claim 1, wherein the main body further comprises a hollow shaft, and a first side plate adjacent and parallel to the shaft, the cover further comprises a second side plate parallel to the first side plate, two extending portions substantially perpendicularly extending from the second side plate at its ends, each extending portion defines a through hole parallel to the second side plate in lengthwise orientation, the two extending portions are placed at two opposite ends of the shaft, the two rotation shafts are respectively passed through the through holes to be inserted into the shaft, thereby rotatably connecting the cover to the main body.

4. The miniature electronic device as described in claim 3, wherein the main body further comprises two blind holes substantially perpendicularly extending from the first side plate, and one end of the each rotation member is rotatably received in the blind hole.

5. The miniature electronic device as described in claim 4, wherein the first annular groove and the second annular groove of each of the rotation members are inside of the two blind holes and the geared portion of the each of the rotation members is exposed.

6. The miniature electronic device as described in claim 1, wherein the main body further comprises a sliding surface parallel and adjacent to the first side plate, and the sliding surface is configured for providing a slideway for the two sliding boards.

7. The miniature electronic device as described in claim 1, wherein each of the connection members is a lightweight cord made of metal.

8. A miniature electronic device comprising:
   a main body comprising:
      two rotation members each defining a first annular groove and a second annular groove around a lateral surface thereof, and a geared portion formed at an end thereof; and
      two connection members each comprising a first connection portion and a second connection portion parallel to the first connection portion and having an equal length with the first connection portion, wherein one end of the first connection portion is counter-clockwise tightenly coiled around the first annular groove of a corresponding one of the two rotation members and one end of the second connection portion is clockwise tightenedly coiled around the second annular groove of the corresponding one of the two rotation members;
   a cover rotatably connected to the main body and comprising two rotation shafts each comprising a first annular groove and a second annular groove around a lateral surface thereof, wherein another end of the first connection portion is be tightened to clockwise coil around the second annular groove of a corresponding one of the two rotation shafts, causing the first connection portion to be tightened between the first annular groove of the corresponding rotation member and the second annular groove of the corresponding rotation shaft, and another end of the second connection portion is tightened to counter-clockwise coil around the first annular groove of the corresponding one of the two rotation shafts, causing the second connection portion to be tightened between the second annular groove of the corresponding rotation member and the first annular groove of the corresponding rotation shaft;

two sliding boards slidably connected to the main body and each of the two sliding boards comprising a rack; and a functional component mounted on the main body and below the two sliding boards;

wherein when the cover is opened or closed, the two rotation shafts are rotated together with the cover and drive the first connection portions and the second connection portions to move, causing the two rotation members to rotate relative to the main body, the two geared portions are then driven to rotate and engage the two racks to cause the two sliding boards to slide relative to the main body, thereby exposing or covering the functional component.

* * * * *